US007309399B2

(12) United States Patent
Lammers

(10) Patent No.: US 7,309,399 B2
(45) Date of Patent: Dec. 18, 2007

(54) SYSTEM AND METHOD FOR MANUFACTURING FILLING STRIPS CONFIGURED FOR USE WITH A CORRUGATED MEMBER

(75) Inventor: Robert Lammers, Roseville, CA (US)

(73) Assignee: SFS intec AG, Heerburgg (CH)

( * ) Notice: Subject to any disclaimer, the term of this patent is extended or adjusted under 35 U.S.C. 154(b) by 282 days.

(21) Appl. No.: 10/847,036

(22) Filed: May 17, 2004

(65) Prior Publication Data

US 2005/0092426 A1 May 5, 2005

Related U.S. Application Data

(60) Provisional application No. 60/515,685, filed on Oct. 30, 2003.

(51) Int. Cl.
*B32B 37/00* (2006.01)

(52) U.S. Cl. ...................... 156/259; 156/264; 156/271; 156/289

(58) Field of Classification Search ................ 156/259, 156/264, 271, 512, 272.8, 71, 254, 209, 219; 52/300, 533, 273, 553, 58; 83/27, 31, 32, 83/53; 428/141; 277/921
See application file for complete search history.

(56) References Cited

U.S. PATENT DOCUMENTS

| | | | | | |
|---|---|---|---|---|---|
| 1,858,224 | A | * | 5/1932 | Fischer | 52/300 |
| 2,021,929 | A | * | 11/1935 | Voigt | 52/277 |
| 2,641,340 | A | * | 6/1953 | Howe | 52/92.2 |
| 3,767,500 | A | | 10/1973 | Tally et al. | |
| 4,025,373 | A | | 5/1977 | Hirsch et al. | |
| 4,151,319 | A | | 4/1979 | Sackoff et al. | |
| 4,484,574 | A | | 11/1984 | DeRusha et al. | |
| 5,700,340 | A | | 12/1997 | Johnson et al. | |
| 5,738,748 | A | | 4/1998 | Mitchell, Jr. | |
| 5,804,024 | A | | 9/1998 | Bloch et al. | |
| 5,902,432 | A | | 5/1999 | Coulton et al. | |
| 6,174,399 | B1 | | 1/2001 | DeCandia et al. | |
| 6,419,780 | B1 | * | 7/2002 | Queisser | 156/259 |
| 6,449,911 | B1 | * | 9/2002 | Hudson | 52/58 |
| 6,540,865 | B1 | | 4/2003 | Miekka et al. | |
| 2003/0089552 | A1 | * | 5/2003 | Sahawneh | 182/1 |

FOREIGN PATENT DOCUMENTS

| | | | |
|---|---|---|---|
| EP | 0120653 | * | 10/1984 |
| JP | 9 25682 | * | 1/1997 |
| WO | WO 01/68329 | | 9/2001 |

* cited by examiner

*Primary Examiner*—James Sells
(74) *Attorney, Agent, or Firm*—Volpe and Koenig, PC

(57) ABSTRACT

A method of manufacturing filling strips for placement between a surface and a corrugated member wherein the corrugation defines a profile. The method includes: providing a sheet of material having a longitudinal axis and first and second major surfaces; forming at least one cut generally through the sheet, the at least one cut extending generally in a longitudinal direction of the sheet to follow a path that corresponds to the profile, wherein the at least one cut divides this sheet into at least two filling strips each having a corrugated member contacting surface that extends between the first and second major surfaces; and separating the sheet into the at least two filling strips.

14 Claims, 3 Drawing Sheets

SYSTEM AND METHOD FOR MANUFACTURING FILLING STRIPS CONFIGURED FOR USE WITH A CORRUGATED MEMBER

BACKGROUND

The present invention is directed to filling strips and, more specifically, is directed to improved filling strips and to a system and method for producing such filling strips that is adapted for automation.

Filling strips are typically used between a corrugated member and a corresponding support to prevent dirt, water and/or debris from passing therebetween. One common application of filling strips is to place filling strips between the top of wall and corrugated metal roof supported by the wall. Currently, filling strips are manufactured by intermittently, manually advancing a foam sheet along a conveyor through a vertical die press that punches out the necessary filling strips. Due to the manufacturing errors which would result from attempting to successively cut portions of a filling strip having a length greater than that of the die, the length of filling strips is generally limited by the size of the cutting die. Today filling strips are punched out of foam sheets that have a width generally equal to the size of the die. Multiple drawbacks result from manufacturing filling strips using a die as described above.

One drawback is the increased waste material that results from having to space apart the cuts that are made in the sheet of material used to form the filling strips so that the cut strips are spaced apart from each other along the sheet to prevent the die from damaging portions of already cut filling strips. Additionally, due to the limited length of the filling strips, the packaging of filling strips wound in a roll is not practical.

Furthermore, for many jobs, the limited length of the filling strips requires that multiple filling strips be placed end-to-end along a side of a building and secured to each other, preferably with interlocking ends, to fill a gap between a corrugated member and a corrugated member supporting surface. The use of interlocking ends does not prevent individual filling strips from separating from each other which results in wind borne contaminates and water being blown between the corrugated member and supporting surface.

It would be advantageous to provide a system and method for manufacturing filling strips that preferably: allows the filling strips to be placed in a roll after they have been cut; reduces or eliminates the amount of waste material generated during manufacturing; facilitates the automation of the manufacturing of the fillings strips; allows for a single continuous filling strip to be used along an entire length of a corrugated member and that produces filling strips that are relatively easier to install than currently available filling strips.

SUMMARY

One embodiment of the present invention is directed to a method of manufacturing roof closure filling strips for a roof having a profile. The method includes: providing a sheet of material having a longitudinal axis and first and second major surfaces; forming at least one cut generally through the sheet, the at least one cut extending generally in a longitudinal direction of the sheet to follow a path that corresponds to the profile, wherein the at least one cut divides the sheet into at least two roof closure filling strips each having a roof contacting surface that extends between the first and second major surfaces; and separating the sheet into the at least two roof closure filling strips.

A separate aspect of the present invention is directed to a method of manufacturing filling strips for placement between a surface and a corrugated member wherein the corrugation defines a profile. The method includes: providing a sheet of material having a longitudinal axis and first and second major surfaces; forming at least one cut generally through the sheet, the at least one cut extending generally in a longitudinal direction of the sheet to follow a path that corresponds to the profile, wherein the at least one cut divides this sheet into at least two filling strips each having a corrugated member contacting surface that extends between the first and second major surfaces; and separating the sheet into the at least two filling strips.

A separate aspect of the present invention is directed to a system for automating the manufacturing of roof closure filling strips including a supply station configured to hold a sheet of material having a longitudinal axis and first and second major surfaces. A cutting station is configured to make at least one cut generally through the sheet which extends generally in a longitudinal direction of the sheet. The at least one cut is shaped to correspond to a profile of a corrugated roof. The at least one cut divides the sheet into at least two roof closure filling strips each having a roof contacting surface that extends between the first and second major surfaces. A collection station is configured to receive the at least two roof filling strips. A conveyor is configured to transport the sheet from the supply station, through the cutting station, and to the collection station.

A separate aspect of the present invention is directed to a method of manufacturing and installing filling strips between a surface and a corrugated member having a profile. The method includes: providing a sheet of material having a longitudinal axis and first and second major surfaces; forming at least one cut generally through the sheet, the at least one cut extending generally in a longitudinal direction of the sheet to follow a path that corresponds to the profile, wherein the at least one cut divides the sheet into at least two filling strips each having a corrugated member contacting surface that extends between the first and second major surfaces; separating the sheet into the at least two filling strips; rolling at least one of the filling strips into a roll; unwinding the roll to provide a filling strip; applying the filling strip to the surface; and positioning the corrugated member such that the corrugations are aligned with the corrugated member contacting surface of the filling strip.

BRIEF DESCRIPTION OF THE SEVERAL VIEWS OF THE DRAWINGS

The foregoing summary, as well as the following detailed description of the preferred embodiment of the present invention will be better understood when read in conjunction with the appended drawings. For purposes of illustrating the invention, there is shown in the drawings an embodiment which is presently preferred. It is understood, however, that the invention is not limited to the precise arrangement and instrumentality shown. In the drawings.

DETAILED DESCRIPTION OF THE PREFERRED EMBODIMENT

Figure 1:
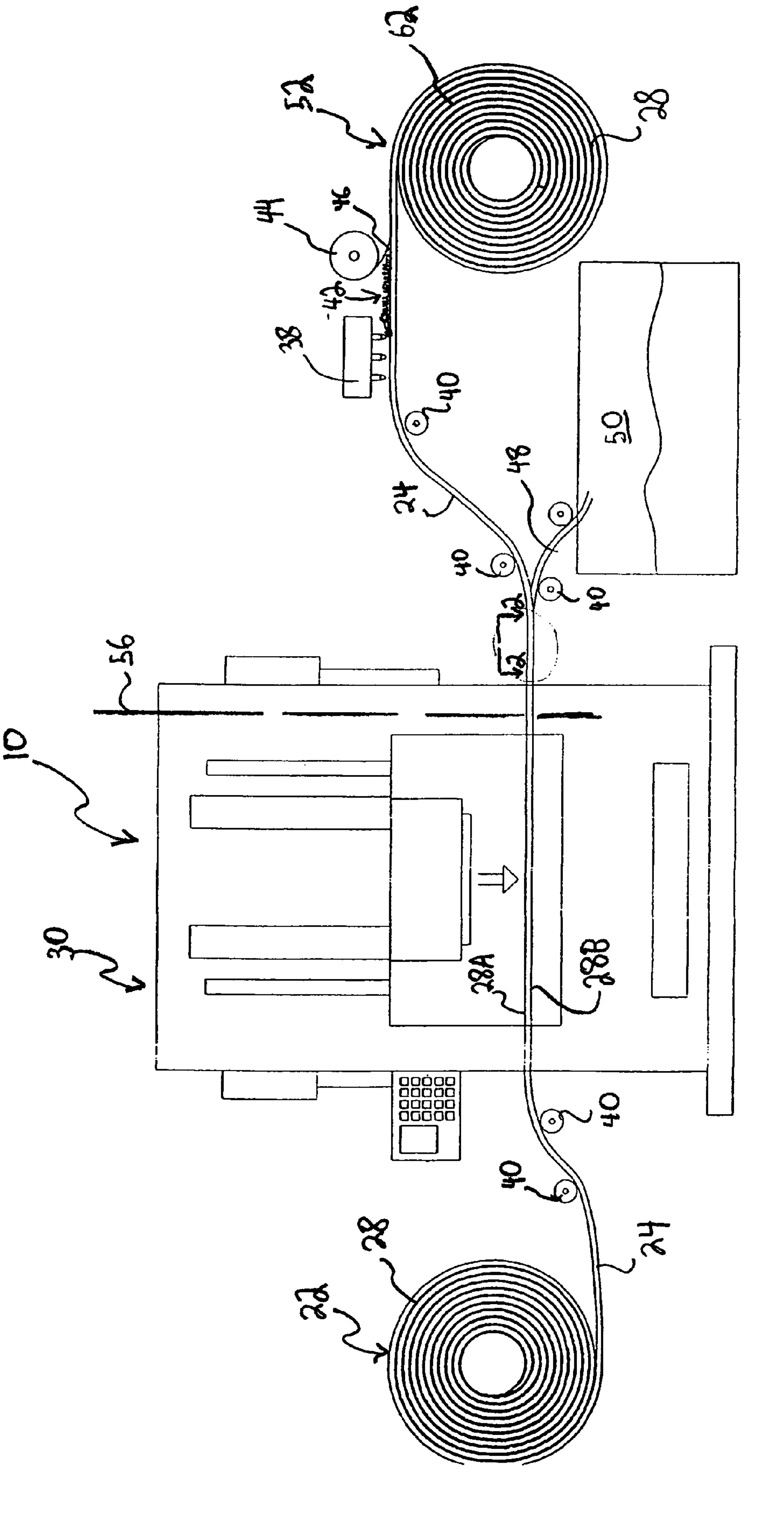
FIG. 1 is a schematic of a system for manufacturing filling strips according to the preferred embodiment of the present invention.

Certain terminology is used in the following description for convenience only and is not limiting. The words "right," "left," "upper," and "lower" designate directions in the drawings to which reference made. The words "inwardly" and "outwardly" refer to directions toward and away from, respectively, the geometric center of the referenced system component and designated parts thereof. The word "profile," as used in the claims and in the corresponding portions of the specification in reference to a roof or a corrugated member having a profile means "a shape or curvature of the corrugated member along a path extending in a single direction including any curvature resulting from corrugations intersecting the path." The word "conveyor," as used in the claims and in the corresponding portions of the specification, means "any one of a belt conveyor, a linkage conveyor, a series of rollers, a pallet transport system and the like." Additionally, the words "a" and "one" are defined as including one or more of the referenced item unless specifically stated otherwise. The terminology includes the words above specifically mentioned, derivatives thereof, and words of similar import.

Figure 2:
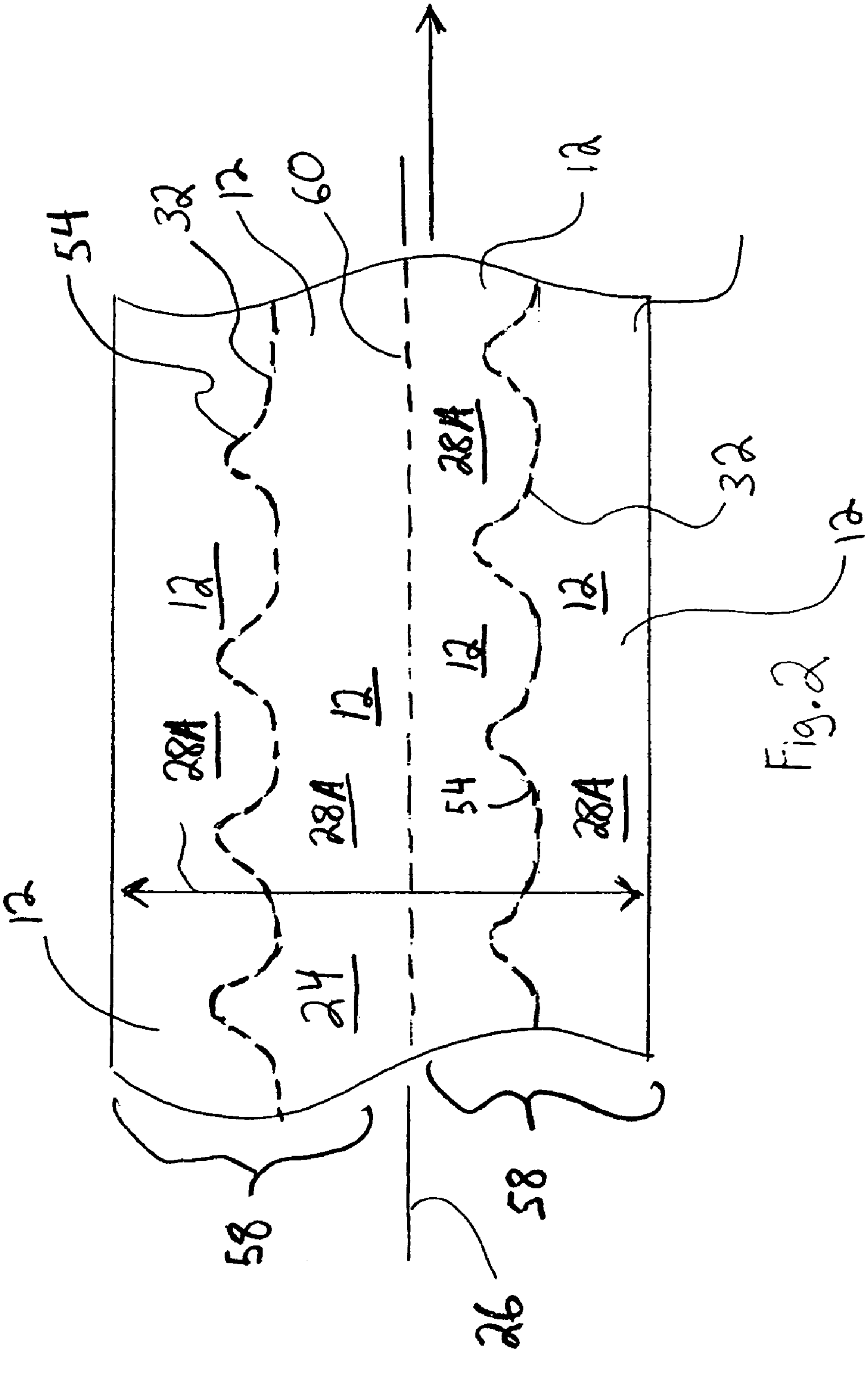
FIG. 2 is a broken away view of a sheet of material that has been cut by the cutting station of FIG. 1 in accordance with the preferred method of the present invention.
Figure 3:
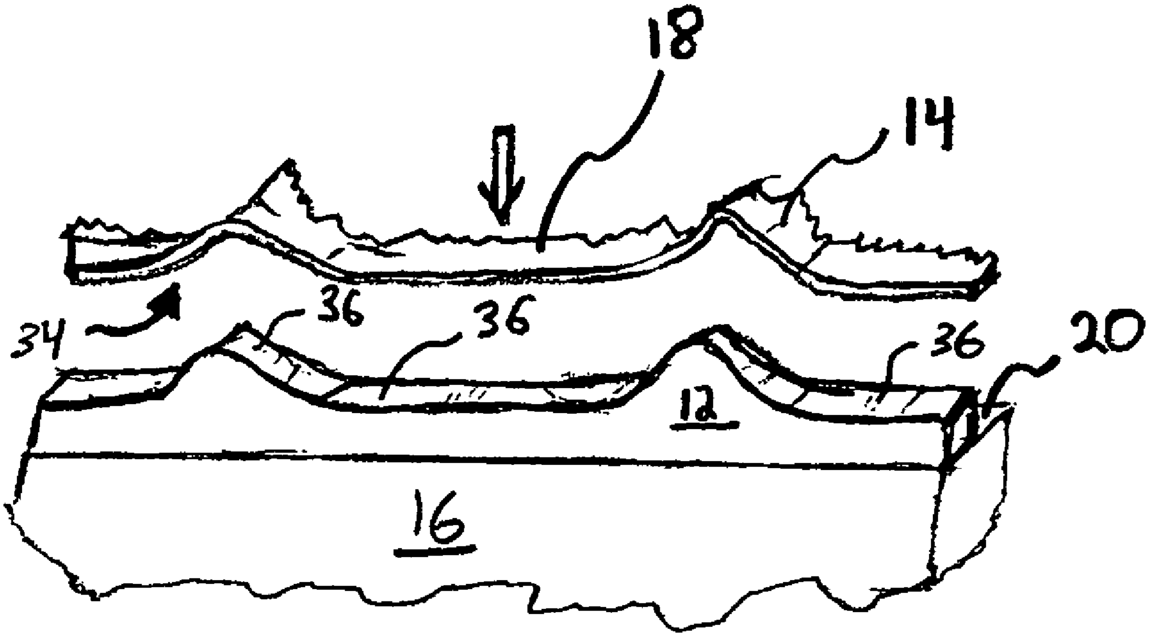
FIG. 3 is a partial, broken away view of a filling strip positioned on a surface with a corrugated member aligned for positioning thereover.

Referring to FIGS. 1-3, a system for manufacturing filling strips is shown and generally designated 10. Briefly stated, the system 10 of the present invention provides for the manufacture of filling strips 12 in a manner conducive to automation and which preferably allows the manufacture of continuous, elongated, filling strips 12.

While the preferred embodiment of the present invention uses filling strips 12 to fill any gap between a corrugated roof 14 and an upper surface 20 of a wall 16, those of ordinary skill in the art will appreciate from this disclosure that the filling strips 12 can be used between any corrugated member 18 and any support surface 20, such as a lateral side of a vertical building support beam. Accordingly, the roof closure filling strips 12 of the present invention will be referred to hereafter in the specification as "filling strips" to emphasize the large number of applications in which the filling strips 12 can be used.

It is preferred that the filling strips 12 are formed of a closed cell foam, such as polyurethane. However, those of ordinary skill in the art will appreciate that any suitable material can be used to form the filling strips 12 of the present invention.

Referring to FIG. 1, a preferred system for manufacturing filling strips 12 includes a supply station 22 which is configured to hold a sheet 24 of a material having a longitudinal axis 26 and first and second major surfaces 28A, 28B, respectively. It is preferred that the sheet 24 is provided as a roll 28 that is capable of being unwound for further processing.

The system 10 includes a cutting station 30 that is configured to make at least one cut 32 generally through the sheet 24 which extends generally in a longitudinal direction of the sheet 24. The at least one cut 32 is shaped to correspond to a profile of a corrugated member 18, or roof 14. The at least one cut 32 divides the sheet 24 into at least two filling strips 12 each having a corrugated member contacting surface 36, or a roof contacting surface, that extends between the first and second major surfaces 28A, 28B.

The cutting station 30 may include any one of a die punch, a water jet, a hot wire, a roller die, a laser and a plurality of moveable blades that can be used to form the at least one cut 32 into the sheet 24. The system 10 preferably includes an adhesive applicator 38 that is located proximate to a conveyor 40 (further described below) and is configured to apply an adhesive 42 on each of the filling strips 12 along a surface generally opposite from the corrugated member contacting surface 36. It is preferred that the adhesive applicator be positioned above the filling strips to place adhesive 42 on an upper surface thereof. To facilitate the application of adhesive 42, it is preferable that the cut sheets 24 be manipulated to separate the filling strips 12 and that the filling strips 24 be rotated about their longitudinal axis while moving from the cutting station 30 to the adhesive applicator 38 to allow the adhesive applicator to apply the adhesive 42 on a surface of the filling strip 12 which faces, or is placed on, a supporting surface 20 (shown in FIG. 3).

It is preferred that the system 10 of the present invention include a tape application station 44 which is located proximate to the conveyor 40 and is configured to apply a release liner 46 to each of the filling strips 12 such that the adhesive 42 is located between the release liner 46 and the corresponding filling strip 12.

Referring to FIG. 2, the system 10 of the present invention can process a sheet 24 of material while producing minimal waste and, preferably, producing no waste. However, if the particular configuration of the filling strips 12 results in the manufacturing of waste 48, then the system 10 may include a waste gathering station 50.

The system includes a collection station 52 that is configured to receive the at least two filling strips 12. It is preferable that the collection station 52 be configured to wind each of the filling strips 12 into a roll 28. The system preferably uses a conveyor 40 to transport the sheet 24 from the supply station 22, through the cutting station 30, and to the collection station 52. While a preferred embodiment of the system 10 of the present invention has been described above, those of ordinary skill in the art will appreciate from this disclosure that various manufacturing processes can be used to produce filling strips 12 according to the method of the present invention, one embodiment of which is described below.

Referring to FIG. 3, one method of manufacturing filling strips 12 for a corrugated member 18 having a profile 34 is detailed below. It is understood, that the steps of the present invention can be performed in any order without departing from the scope of the present invention.

One preferred method of the present invention includes providing the sheet 24 of material having a longitudinal axis 26 and first and second major surfaces 28A, 28B. It is preferred that the sheet 24 is provided as a roll 28 that is capable of being unwound for further processing.

Referring to FIG. 2, at least one cut 32 is formed generally through the sheet 24. The at least one cut 32 is extends generally in a longitudinal direction (i.e., in a leftward or rightward direction as shown in FIG. 2) of the sheet to follow a path 54 that generally corresponds to the profile 34. It is preferred that the at least one cut 32 is generally perpendicular to the first major surface 28A. However, those of ordinary skill in the art will appreciate from this disclosure that the at least one cut 32 may be generally arcuate or angled relative to a perpendicular 56 from the first major surface 28A.

The at least one cut 32 divides the sheet into at least two filling strips 12 each having a corrugated member contacting surface 36 that extends between the first and second major surfaces 28A, 28B. Referring to the top half of FIG. 2, it is preferred that each of the at least one cuts 32 results in a pair 58 of complementary filling strips 12. By cutting the sheet 24 in the longitudinal direction, the method of the present invention preferably produces a pair 58 of complementary filling strips for each at least one cut 32.

The complementary filling strips 112 can then be used on opposite sides of a corrugated roof 14, or other corrugated panels. For example, a first filling strip of a pair 58 is configured for positioning between a surface 20 and a corrugated member 18. The remaining filling strip 12 of the pair 58 is then adapted to engage the opposite side of the corrugated member 18 as is commonly done between a corrugated roof 14 and a roof cap. Thus, the filling strip 12 for positioning between the top of a wall 16 and the corrugated roof 14 as well as the filling strip 12 for between the top of the corrugated roof 14 and the roof cap can be processed and cut simultaneously from a single sheet 24.

It is further preferred that two or more cuts 32 are formed in the sheet 24 such that two or more pairs 58 of filling strips 12 are manufactured simultaneously. When multiple pairs 58 of filling strips are formed from a single sheet 32, it is preferable to make a longitudinal cut 60 between each pair 58 to separate adjoining filling strips 12.

The present invention is not limited to the manufacturing of any number of filling strips 12 or any number of pairs 58 of filling strips 12 during the processing of a single sheet 24 of material. Adjacent pairs 58 of filling strips 58 may have different profiles without departing from the scope of the present invention. It is preferred that when the sheet 24 is separated into filling strips 12, that minimal waste 48 is produced. It is more preferable that substantially no waste is generated during the processing of the sheet 24 into filling strips 12.

The method of the present invention includes separating the sheet 24 into the at least two filling strips 12. It is preferable that an adhesive 42 is applied on each of the filling strips 12 along the surface generally opposite the corrugated member contacting surface 36. It is also preferred that each of the filling strips 12 is wound into a roll 28 such that the adhesive 42 detachably secures successive windings 62 of the roll 28 in position. The adhesive 42 may be engaged and disengaged two or more times such that each filling strip 12 can be removed from the roll and secured proximate to a support surface 20, such as the roof 14, via the adhesive 42. Alternatively, the method may include applying a release liner 46 to each of the filling strips 12 such that the adhesive 42 is located between the release liner and the corresponding filling strip 12.

It is preferred that the filling strip 12 of the present invention provide a continuous closure for one entire length of a roof 14 or corrugated member 18.

The method of the present invention may also include installing a filling strip 12 by winding at least one of the filling strips 12 into a roll 28. The roll 28 is then unwound to provide a filling strip, preferably after the roll 28 has been transported to a job site. Then, the filling strip 12 is applied to the surface 20 so that the corrugated member 18 can be positioned with its corrugations aligned with the corrugated member contacting surface 36 of the filling strip 12.

Referring to FIGS. 1-3, one embodiment of the present invention operates as follows. A supply roll 28 of material suitable for use as filling strips 12 is unwound to provide a sheet 24 that is conveyed through a cutting station 30. The cutting station 30 forms at least one cut 32 generally through the sheet 24 such that the at least one cut 32 extends generally in a longitudinal direction of the sheet 24 to follow a path 54 that generally corresponds to the profile 34 of the corrugated member 18 with which the filling strip 12 is intended to be used. The at least one cut 32 divides the sheet 24 into at least two filling strips 12 each having a corrugated member contacting surface 36 that extends between the first and second major surfaces 28A, 28B. Then, the cut sheet 24 is transported and preferably manipulated so that the individual filling strips 12 are separated and rotated prior to arriving at an adhesive applicator 38. The adhesive applicator 38 deposits adhesive 42 on a side of the filling strips 12 that is intended to contact a support surface 20. Then, a release liner 46 sandwiches the adhesive 42 between the liner 46 and the filling strips 12. The completed filling strips 12 are then wound into rolls 28 and are ready for use.

It is recognized by those skilled in the art, that changes may be made to the above described embodiments of the invention without departing from the broad inventive concept thereof. For example, while a generally oscillating consistent path 54 is shown in FIG. 2, the at least one cut 32 may be irregular and of any shape depending upon its intended use without departing from the present invention. It is understood, therefore, that this invention is not limited to the embodiments disclosed, but is intended to cover all modifications which are within the spirit and scope of the invention as defined by the appended claims and/or shown in the attached drawings.

What is claimed is:

1. A method of manufacturing roof closure filling strips for a roof having a profile, the method comprising:

providing a sheet of material having a longitudinal axis and first and second major surfaces;

forming at least one cut generally through the sheet, the at least one cut extending generally in a longitudinal direction of the sheet to follow a path that corresponds to the profile, wherein the at least one cut divides the sheet into at least two roof closure filling strips each having a roof contacting surface that extends between the first and second major surfaces; and separating the sheet into the at least two roof closure filling strips;

wherein the step of forming at least one cut comprises forming at least one cut that is generally angled relative to a perpendicular from the first major surface.

2. The method of claim 1, wherein each of at least one cuts results in a pair of complementary roof closure filling strips.

3. The method of claim 1, wherein the step of forming at least one cut comprises cutting the sheet such that when the sheet is separated into roof closure filling strips, there is substantially no wasted sheet material.

4. The method of claim 1, wherein the step of providing the sheet comprises providing a roll of material capable of being unwound to provide the sheet.

5. The method of claim 1, wherein the step of forming at least one cut comprises cutting the sheet such that when the sheet is separated into roof closure filling strips, there is minimal waste.

6. The method of claim 1, wherein the step of separating the at least two roof closure filling strips comprises rolling each of the roof closure filling strips into a roll.

7. The method of claim 1, wherein the step of forming at least one cut comprises forming at least one cut that is generally perpendicular to the first major surface.

8. The method of claim 1, wherein the step of forming at least one cut comprises cutting the sheet with any one of a die punch, a water jet, a hot wire, a roller die, a laser, and a plurality of moveable blades.

9. The method of claim 1, further comprising applying an adhesive on each of the roof closure filling strips along a surface generally opposite from the roof contacting surface.

10. A method of manufacturing roof closure filling strips for a roof having a profile, the method comprising:

providing a sheet of material having a longitudinal axis and first and second major surfaces;

forming at least one cut generally through the sheet, the at least one cut extending generally in a longitudinal direction of the sheet to follow a path that corresponds to the profile, wherein the at least one cut divides the sheet into at least two roof closure filling strips each having a roof contacting surface that extends between the first and second major surfaces;

separating the sheet into the at least two roof closure filling strips;

applying an adhesive on each of the roof closure filling strips along a surface generally opposite from the roof contacting surface; and organizing each of the roof closure filling strips into a roll such that the adhesive detachably secures successive windings of the roll generally in position.

11. The method of claim 10, wherein the step of applying the adhesive comprises applying an adhesive that can be engaged and disengaged at least twice such that each roof closure filling strip can be removed from the roll and secured proximate to the roof via the adhesive.

12. The method of claim 9, further comprising applying a release liner to each of the roof closure filling strips such that the adhesive is located between the release liner and the corresponding roof closure filling strip.

13. The method of claim 12, further comprising organizing each of the roof closure filling strips into a roll.

14. The method of claim 1, wherein each of the roof closure filling strips provides a continuous closure for one entire length of a roof.

* * * * *